United States Patent [19]

Sanner et al.

[11] 4,024,578
[45] May 17, 1977

[54] SCAN CONTROL AND SENSOR SAMPLING SYSTEM FOR SELF-SCANNED PHOTOSENSOR ARRAYS

[75] Inventors: Medford D. Sanner, Irving; Robert M. McMillan, Carrollton; Ellis K. Cave, Garland, all of Tex.

[73] Assignee: Recognition Equipment Incorporated, Dallas, Tex.

[22] Filed: Jan. 6, 1976

[21] Appl. No.: 646,980

[52] U.S. Cl. .............................................. 358/213
[51] Int. Cl.² ......................................... H04N 3/14
[58] Field of Search .................. 178/7.1; 250/211 J; 358/213

[56] References Cited
UNITED STATES PATENTS

| | | | |
|---|---|---|---|
| 3,800,079 | 3/1974 | McNeil et al. | 178/7.1 |
| 3,822,362 | 7/1974 | Weckler et al. | 178/7.1 |

*Primary Examiner*—John C. Martin
*Assistant Examiner*—Mitchell Saffian
*Attorney, Agent, or Firm*—John E. Vandigriff

[57] ABSTRACT

A method and system is provided for driving a self-scanned photosensor array at high sensor cell scan rates, and sampling the sensor cells serially addressed by the array without comprising either image integrity or array frame rate.

End of line (EOL) and end of frame (EOF) timing signals generated by the array are sensed and operated upon to limit the voltage amplitude swings of the signals, and to reduce noise modulation in the output video signal. A single synchronization signal is formed from the timing signals to accurately identify the last cell of a frame to be scanned, and to synchronize a row counter driving one of two flip-flops providing biphase array clock signals as the flip-flops have minimal pulse skew between complementary outputs, the effects of fixed pattern odd/even noise in the output video signal are substantially reduced. Further, the flip-flops uniquely provide large voltage amplitude swings without attendant heat generation problems.

The sensor cells are serially selected to a wideband, high gain, integrated circuit transresistance video amplifier which converts the recharge current of the sensor cells to a voltage waveform. The amplifier further presents an apparent low input impedance to the array at the operating frequencies, thereby accommodating the recharging of a selected sensor cell in a time period small compared to the cell scan period.

11 Claims, 5 Drawing Figures

SCAN CONTROL AND SENSOR SAMPLING SYSTEM FOR SELF-SCANNED PHOTOSENSOR ARRAYS

CROSS REFERENCES TO RELATED APPLICATIONS

This is an improvement to U.S. patent application Ser. No. 462742, filed Apr. 22, 1974, now U.S. Pat. No. 3,947,817, and entitled "Hand Operated Optical Character Recognition Wand", and to U.S. patent application Ser. No. 462743, filed Apr. 22, 1974, now U.S. Pat. Not. 3,976,973, and entitled "Horizontal Scan Vertical Simulation Character Reading". Both of the applications are assigned to the assignee of the present invention.

FIELD OF THE INVENTION

This invention relates to systems for driving a self-scanned photosensor array, and sampling the sensor cells addressed by the array. In a specific aspect, a scan control and sample system for a two-dimensional photodiode array is provided which is compatible with integrated circuit technology, and which effectively attenuates array generated noise at high cell scan rates.

DESCRIPTION OF THE PRIOR ART

Systems for driving two-dimensional arrays of photosensitive elements have comprised two sets of biphase clocks, one set for controlling the vertical scan and a second set for controlling the horizontal scan. A problem frequently encountered with such systems is the existence of array generated noise in the output video signal. Such noise is generally referred to as fixed pattern or odd/even noise. The corrective measures taken have been of the noise cancellation type wherein the rise and fall times of the two phases of a biphase clock signal must be in coincidence and equal. The existence of a pulse skew between the complementary outputs of commercially available biphase clock generating devices, however, has prevented the efficient cancellation of clock signal noise. Further, the biphase devices generally are of a bipolar type which dissipates heat at a rate prohibitive to hand-held operations or to the efficient operation of a system confined within a small volume.

In order to assure that a complete rather than a fragmented image is transferred from a photosensor array, the scanning operation of the array must be synchronized with the drive electronics. Prior drive systems have included counters in which synchronization is achieved by controlling the timing of the start signals to both a horizontal and a vertical scan counter. A more refined method of control that has been used includes the sensing of end of line (EOL) and end of frame (EOF) timing signals generated by the array to synchronize external cell and row counters. The voltage swings of the EOL and EOF timing signals, however, tend to effect a modulation in the output video signal. Further, a greater than two cell scan period delay has been required to allow the transients in the row scan signal to decay, and thereby provide a more accurate selection of the sensor cells. The disadvantage in such a delay is that for a given cell scan rate, the number of frames of data per second that may be accommodated is reduce.

A further problem in prior driving systems occurs in the sampling of the sensor cells as they are serially selected. As used herein, the word sampling collectively refers to the recharging of a selected sensor cell, the conversion of the recharging current to a voltage, and the amplification of such voltage. The light falling on a cell is effectively integrated during a frame period by causing each cell to be discharged in proportion to the light energy sensed. The video signal, therefore, is the amount of charge required to reset each cell to its normally fully charged condition. Where the scan rate is high, a next cell may be addressed before a previously selected cell has completely recharged. Thus, an image smearing occurs. To circumvent such problems, two methods generally have been employed. In one method, a high performance operational amplifier is used to form a transresistance amplifier for the conversion of cell charge currents into a useful output voltage at the cell scan rate. In operating a two-dimensional array at a cell scan rate near 2 MHz, however, such an amplifier is difficult to stabilize as it must have a unity gain bandwidth of 50 MHz or higher to provide an apparent low input impedance. Recharging times short compared to the sensor cell scan period are thereby accommodated.

A second method comprises the use of an operational amplifier as a resettable integrator. Here, the noise spikes generated by the clock pulses average out to zero by the end of the integration period, and a low video line charging impedance is provided to accommodate the recharging and sampling of cells at the cell scan rate. As with the first method, the operational amplifier at high cell scan rates of the order of 2 MHz is difficult to stabilize. It also must operate with a wide unity gain bandwidth during the reset or recharging period. In general, both of the prior methods employ systems which are too large and complex for embodiment in a compact hand-held unit.

U.S. Pat. No. 3,822,362 issued to Weckler discloses a two-dimensional array drive system which generates a biphase clock signal to drive a pair of MOS shift registers operating as scan generators. The shift registers are implemented on the same monolithic silicon chip as the photosensor array, and must be symmetrically arranged on the chip to reduce the occurrence of noise transients in the video output signal.

The present invention provides a high performance scan control and sensor sampling system for a two-dimensional photosensor array which may be implemented with integrated circuit technology into a small volume embodiment. The effects of fixed pattern odd/even noise and array timing signal modulation in the output video signal are substantially reduced, and the image integrity is sustained at high cell scan rates without requiring scanning delays, critical frequency dependent adjustments or symmetrical arrangements of component parts.

SUMMARY OF THE INVENTION

The present invention is directed to a high frequency scan control and sensor cell sampling system for a two-dimensional photosensor array which is compatible with integrated circuit embodiments, and which provides a video signal substantially free of image smearing and array generated noise.

More particularly, the array end of line (EOL) and end of frame (EOF) timing signals are sensed by a monolithic integrated circuit which limits the voltage amplitude swing of the timing signals to substantially reduce a related modulation of the output video signal, and which effectively combines the timing signals to form a single synchronization signal accurately identifying the last cell of a frame to be scanned. The synchronization signal is applied to a counter which drives one of two D-types flip-flops to form a biphase clock signal controlling the vertical or row scan of the array. The second flip-flop is driven by an oscillator at a frequency higher than the row scan rate to provide a biphase clock signal controlling the column or horizontal scan of the array. Each of the two flip-flops are implemented on a CMOS integrated circuit chip to provide large voltage amplitude swings without the excessive generation of heat, and to reduce the effects of fixed pattern odd/even noise in the output video signal.

The sensor cells comprising the array are serially selected to a wideband, high gain, integrated circuit transresistance video amplifier which accommodates the recharging of the sensor cells at high cell scan rates, and which converts the recharging currents to an amplified video voltage waveform.

DESCRIPTION OF THE DRAWINGS

For a more complete understanding of the present invention and for further objects and advantages thereof, reference may now be had to the following description taken in conjunction with the accompanying drawings in which.

DESCRIPTION OF PREFERRED EMBODIMENTS

FIG. 1

Figure 1:
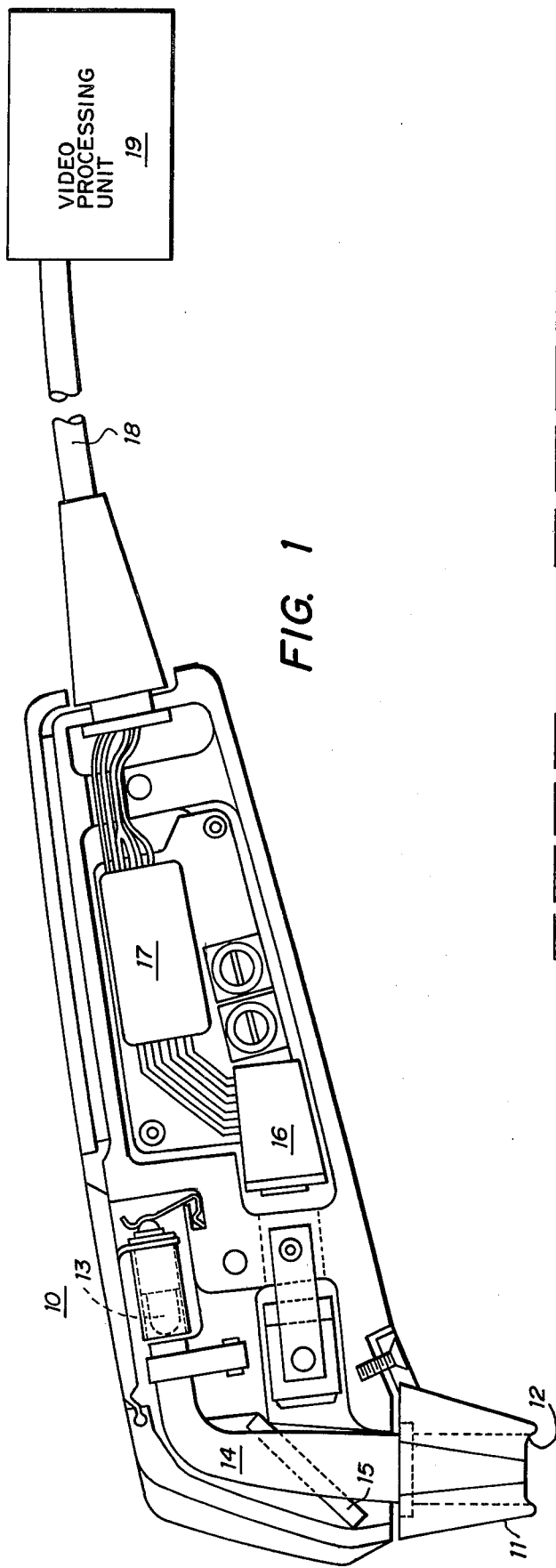
FIG. 1 is a side view of a hand-held OCR wand embodying the invention and having an outer cover removed.

FIG. 1 is a side view of a hand-held, optical character recognition (OCR) wand 10 for the reading of data fields printed upon merchandise or tagw. Wand 10 is a hand operated optical data acquisition and processing system including a wand tip 11 with an aperture 12. Aperture 12 normally extends the width of a numeral or character to be read, and spans several times the normal height of such characters. A lamp 13 is mounted in the upper portion of wand 10 with suitable optical means such as fiber optic member 14 directing light through the aperture onto a data field to be viewed. The character image appearing in aperture 12 is reflected by a mirror 15 onto a two-dimensional self-scanned photosensor array 16, which is connected by way of electronic circuitry 17 and a cable 18 to a video processing unit 19.

FIG. 2

Figure 2:
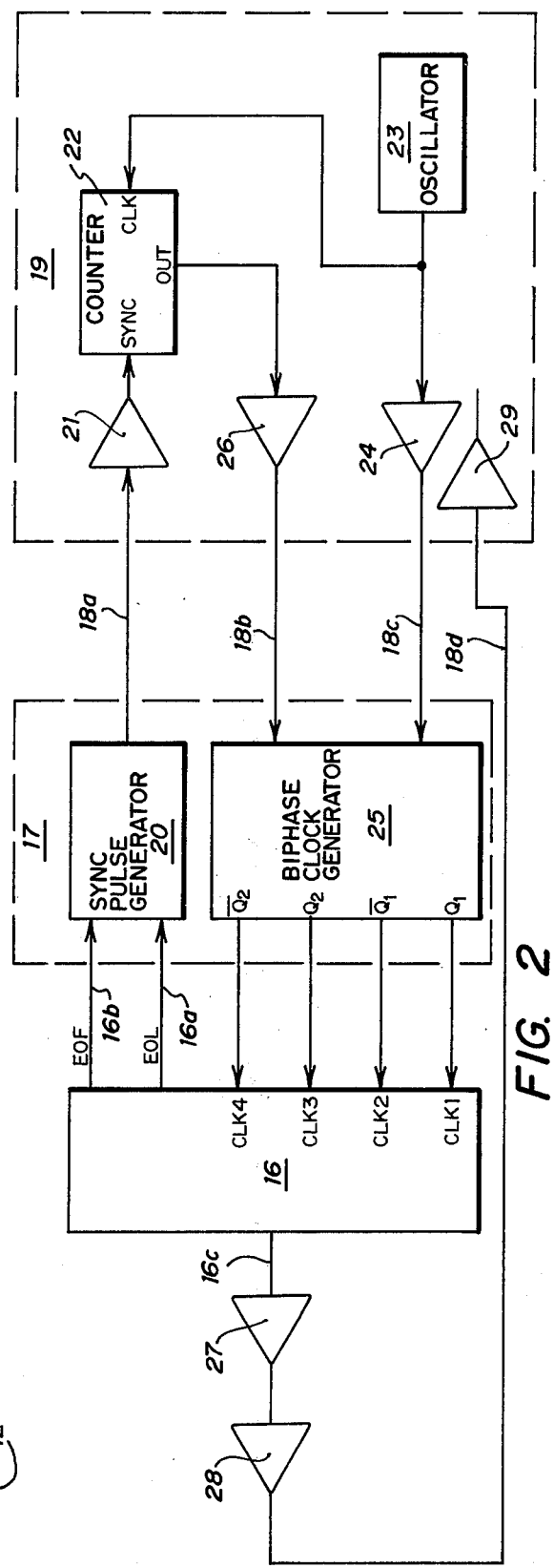
FIG. 2 is a functional block diagram of a scan control and sensor sampling system comprising the system of FIG. 1.

FIG. 2 is a functional block diagram of a driving and sample control system for self-scanned photosensor array 16.

Typically array 16 comprises a 32 × 32 matrix of sensor cells with control circuitry to scan the array one row at a time for covering the entire field represented by the conditions in the various cells in the array.

When the last cell of a row of sensor cells has been scanned, an end of line (EOL) signal is issued by array 16 along a data line 16a to one input of a synchronization pulse generator 20. Further, when the last cell of the last row of sensor cells comprising array 16 has been scanned, array 16 issues an end of frame (EOF) signal along a data line 16b to a second input of generator 20. Generator 20 in turn issues a pulse, the leading edge of which signals the time of completion of a scanning of the last cell in the last row of cells comprising array 16. The pulse is applied along a data line 18a and through a line receiver 21 to the synchronization input of a divide-by-fourteen counter 22.

Generator 20 is an integrated circuit which combines the EOL and EOF timing signals issued by array 16 to form in less than a cell scan period a single and accurate frame synchronization signal on line 18a. Further, the voltage amplitude swings of the array timing signals are limited to substantially reduce the related modulation of the video output signal. In the preferred embodiment described herein, the generator 20 is TTL logic level compatible at line 18a, and capable of driving the capacitance of a 12 foot long cable.

The clock input to counter 22 is connected to the output of an oscillator 23 providing a frequency equal to the sensor cell scan rate. The output of oscillator 23 also is applied through a line driver 24 to one input of a biphase clock generator 25. The output of counter 22, which is at a frequency equal to the row scan rate, is applied through a line driver 26 to a second input of generator 25. In the preferred embodiment disclosed herein, the cell scan rate is 1.8 MHz and the row scan rate is 128.57 KHz. Receiver 21, counter 22, oscillator 23, driver 25 and driver 26 comprise component parts of video processing unit 19.

Generator 25 provides complementary clock signals at the Q1 and Q̄1 outputs which are applied to the clock inputs CLK1 and CLK2, respectively, of array 16. The clock signals control the horizontal scanning of a row of sensor cells. In the same manner, complementary clock signals are provided at the Q2 and Q̄2 outputs of generator 25, and applied to the clock inputs CLK3 and CLK4, respectively, to control the row-to-row or vertical scanning of array 16. In the preferred embodiment disclosed herein, the CLK1 and CLK2 clock signals are 900 KHz squarewaves, and the CLK3 and CLK4 clock signals are 64.285 KHz squarewaves. Generators 20 and 25 comprise component parts of circuitry 17.

According to the invention, generator 25 is a type 4013 dual D-type flip-flop implemented with CMOS integrated circuit technology, as manufactured and sold by Solid State Scientific, Inc., of Montgomeryville, Pennsylvania, and identified by model number SCL4013A. The pulse skew between complementary outputs of the flip-flop is held to a maximum of ten nanoseconds, thereby providing an effective cancellation of fixed pattern odd/even noise. The CMOS implementation further provides clock signals having large voltage amplitude swings without the excessive generation of heat.

The video output of array 16 on data line 16c is applied to the input of a preamplifier 27, the output of which is connected through a line driver 28 and along a data line 18d to a line receiver 29 of video processing unit 19. Preamplifier 27 is a wideband, high gain, integrated circuit transresistance video amplifier, and line driver 28 is connected as an emitter follower to drive a 50 ohm cable.

In operation, oscillator 23 provides a 1.8 MHz signal which is applied along data line 18c to the cell clock input of generator 25, and to the clock input of counter 22. Counter 22 thereupon provides a 128.57 KHz signal to the row clock input of generator 25. Generator 25 upon receiving the cell and row clock signals provides complementary 900 KHz signals at the Q1 and $\overline{Q1}$ outputs of generator 25 to control the horizontal scan of array 16, and complementary 64.285 KHz signals at the Q2 and $\overline{Q2}$ outputs for vertical scan control.

Array 16 in the preferred embodiment is LSI integrated circuit array of 14 × 38 photodiodes, which is manufactured and sold by the Reticon Corporation of Mountain View, California, and identified as RA 14 × 38 Self-Scanned Photodiode Array.

When a first row of fourteen photodiodes has been scanned, an EOL timing signal issues along line 16a. Similarly, a signal issues on line 16b when the last cell of the last row of photodiodes has been scanned. Generator 20 operates upon the EOL and EOF signals to form a composite synchronizaiton signal on line 18a which is applied to the sync input of counter 22. The cell and row clock rates are synchronized thereby with the scanning of the array 16.

As the array is scanned, a video signal comprised of a charge proportional to the amount of light sensed by each cell is applied along data lien 16c to the preamplifier 27 which converts the charge current to a useful output voltage. The voltage signal thereafter is applied through line driver 28 to line receiver 29 of video processing unit 19.

FIG. 3

Figure 3:
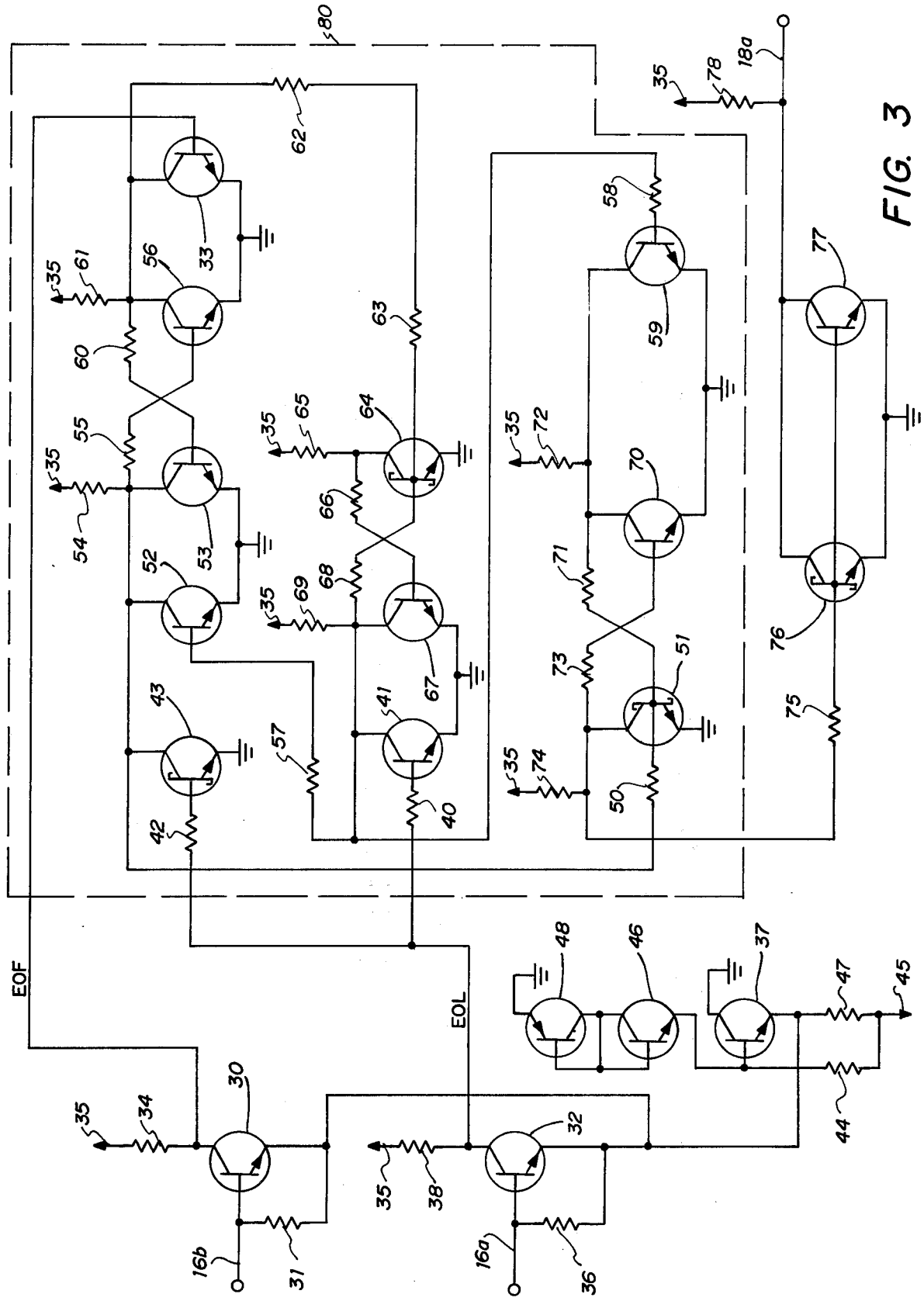
FIG. 3 is a detailed electrical schematic diagram of a synchronization pulse generator comprising the scan control system of FIG. 1.

FIG. 3 is a detailed electrical schematic diagram of sync pulse generator 20 of FIG. 2.

The EOL and EOF timing signals are supplied by array 16 on line 16a and 16b, respectively. The 16b is connected to the base of an NPN transistor 30, and through a 10 K-ohm resistor 31 to the emitter of transistor 30 and to the emitter of an NPN transistor 32. The collector of transistor 30 is connected to the base of an NPN transistor 33, and through a 3.6 k-ohm resistor 34 to a +5 volt source 35.

Line 16a is connected to the base of transistor 32, and through a 10 K-ohm resistor 36 to the emitter of transistor 32 and to the emitter of an NPN transistor 37. The collector of transistor 32 is connected through a 3.6 K-ohm resistor 38 to voltage source 35, through a 1.3 K-ohm resistor 40 to the base of an NPN transistor 41, and through a 1.3 K-ohm resistor 42 to the base of a Schottky transistor 43.

Transistors having a feedback Schottky diode, with the diode cathode connected to the collector and the diode anode connected to the base, are referred to as Schottky transistors. Transistors normally have a very fast turn-on period accompanied by a comparatively slow turn-off action. The slow turn-off is due mainly to a charge storage effect which becomes very prominent when the collector is near the potential of the emitter of the transistor. The placement of a Schottky diode in the feedback of a transistor in effect provides a bypass from the base to the collector when the collector approaches the emitter potential, and thereby prevents transistor saturation.

Continuing with the description of FIG. 3 at transistor 37, the base of transistor 37 is connected through a 3.6 K-ohm resistor 44 to a −12 volt source 45, and connected to the emitter of an NPN transistor 46. The emitter of transistor 37 also is connected through a 1.3 K-ohm resistor 47 to voltage source 45, and the collector is connected to ground. The base of transistor 46 is connected to the base of a PNP transistor 48, and to the collectors of transistors 46 and 48. The emitter of transistor 48 is connected to ground.

Transistors 37, 46 and 48, and resistors 44 and 47 comprise a voltage regulator which acts to hold the emitter of transistor 37 at a −2 volt level.

The collector of transistor 43 is connected through a 3.6 K-ohm resistor 50 to the base of a Schottky transistor 51, to the collectors of NPN transistors 52 and 53, through a 1.3 K-ohm resistor 54 to voltagw source 35, and through a 3.6 K-ohm resistor 55 to the base of an NPN transistor 56. The emitter of transistor 43 is connected to ground.

The base of transistor 52 is connected through a 3.6 K-ohm resistor 57 to the collector of transistor 41, and through resistor 57 and a 3.6 K-ohm resistor 58 to the base of an NPN transistor 59. The emitter of transistor 52 is connected to the emitter of transistor 53 and to ground.

The base of transistor 53 is connected through a 3.1 K-ohm resistor 60 to the collectors of transistors 56 and 33, and through resistor 60 and a 1.3 K-ohm resistor 61 to +5 volt source 35. The emitters of transistors 33 and 56 are each connected to ground, and the collectors are each connected through a 1.3 K-ohm resistor 62 and a 1.8 K-ohm resistor 63 to the base of a Schottky transistor 64.

The collector of transistor 64 is connected through a 1.3 K-ohm resistor 65 to voltage source 35, and through a 3.1 K-ohm resistor 66 to the base of an NPN transistor 67. The emitter of transistor 64 is connected to ground. The base of transistor 64 also is connected through a 3.6 K-ohm resistor 68 to the collectors of transistors 41 and 67, and through resistor 68 and a 1.3 K-ohm resistor 69 to voltage source 35. The emitters of transistors 41 and 67 are each connected to ground.

The collector of transistor 59 is connected to the collector of an NPN transistor 70, and through a 3.6 K-ohm resistor 71 to the base of transistor 51. The collector of transistor 59 also is connected through a 1.3 K-ohm resistor 72 to voltage source 35. The emitters of transistors 59 and 70 are each connected to ground.

The base of transistor 70 is connected through a 900 ohm resistor 73 to the collector of transistor 51, through resistor 73 and a 1.3 K-ohm resistor 74 to voltage source 35, and through resistor 73 and a 900 ohm resistor 75 to the base of a Schottky transistor 76. The emitter of transistor 51 is connected to ground.

The collector of transistor 76 is connected to the collector of an NPN transistor 77, and to line 18a carrying a frame synchronization signal to the video processing unit 19. The collectors of transistors 76 and 77 in addition are each connected through a 1.3 K-ohm resistor 78 to voltage source 35. The emitters of transistors 76 and 77 are each connected to ground, and the base of transistor 76 is connected to the base of transistor 77.

In operation, EOF and EOL timing signals are received on lines 16b and 16a, respectively, from PMOS FET transistors integral to array 16. Transistors 30 and 32 are connected to perform as level adjusters to shift the timing signals from negative PMOS voltages to ground referenced positive going voltages compatible with RTL devices. The emitters of transistors 30 and 32 are each tied to the −2 volt regulator comprised to transistors 37, 46 and 48, and resistors 44 and 47. The cathodes of the base to emitter diodes of transistors 30 and 32 are biased thereby to limit the amplitude swing of the timing signals. Thus, when transistor 32 is conducting, the line 16a is clamped to −1.4 volts. When the transistor is not conducting, however, line 16a swings to the emitter potential of −2 volts. The same relationship occurs between line 16b and transistor 30.

More particularly, when the PMOS FET transistors within array 16 are conducting, they have an effective resistance of 1.0–3.0 K-ohms. In the non-conducting state, however, they have an effective resistance of approximately 10 M-ohms. When the PMOS FET transistors driving lines 16b and 16a are non-conducting, therefore, there is no base current flowing on lines 16a or 16b, and the bases of transistors 30 and 32 are at the emitter potential of −2 volts. When the PMOS transistors are conducting, however, each has an effective resistance of 1–3 K-ohms as compared to the 10 K-ohm resistors 31 and 36. As a result, base currents flow on lines 16a and 16b, and transistors 30 and 32 transition to the conducting state. The bases of transistors 30 and 32 then swing to a −1.4 volt level comprised of the emitter voltage of −2 volts and the +0.6 voltage drop across the base to emitter diodes of the transistors. The voltage swing of the base of each of the transistors 30 and 32, therefore, may be said to be clamped between −2 volts and −1.4 volts. The clamping action in turn acts to substantially reduce the modulation of the output video signal caused by the amplitude swings of the EOL and EOF signals.

The collector voltages of transistors 30 and 32 drive an edge triggered D-type flip-flop 80 comprised of transistors 33, 41, 43, 51–53, 56, 59, 64, 67 and 70. The collector of transistor 32 is connected to the clock input of the flip-flop, and the collector of transistor 30 is connected to the D input of the flip-flop.

The frame synchronization pulse output by flip-flop 80 appears at the collector of Schottky transistor 51, and becomes the complement of the D input to the flip-flop when the clock input transitions to a logic zero. The flip-flop output then is inverted and buffered by transistors 76 and 77, which serve as a TTL compatible line driver. The output of the driver in turn is applied along line 18a of cable 18 leading to the video processing unit 19.

The Schottky transistors illustrated in FIG. 3 are strategically placed for a sharp transistor turn-off at the negative-going edge of the frame synchronization pulse. The sharp transistor turn-off action in turn produces a synchronization signal having sharp pulse edges, thereby contributing to a more accurate synchronization pulse. Further, such use of Schottky transistors eliminates delays which otherwise would occur in the generation of the synchronization pulse. As a consequence of the elimination of such delays, an accurate synchronization pulse identifying the last cell of a scanned frame may be generated within a single sensor cell scan period.

FIG. 4

Figure 4:
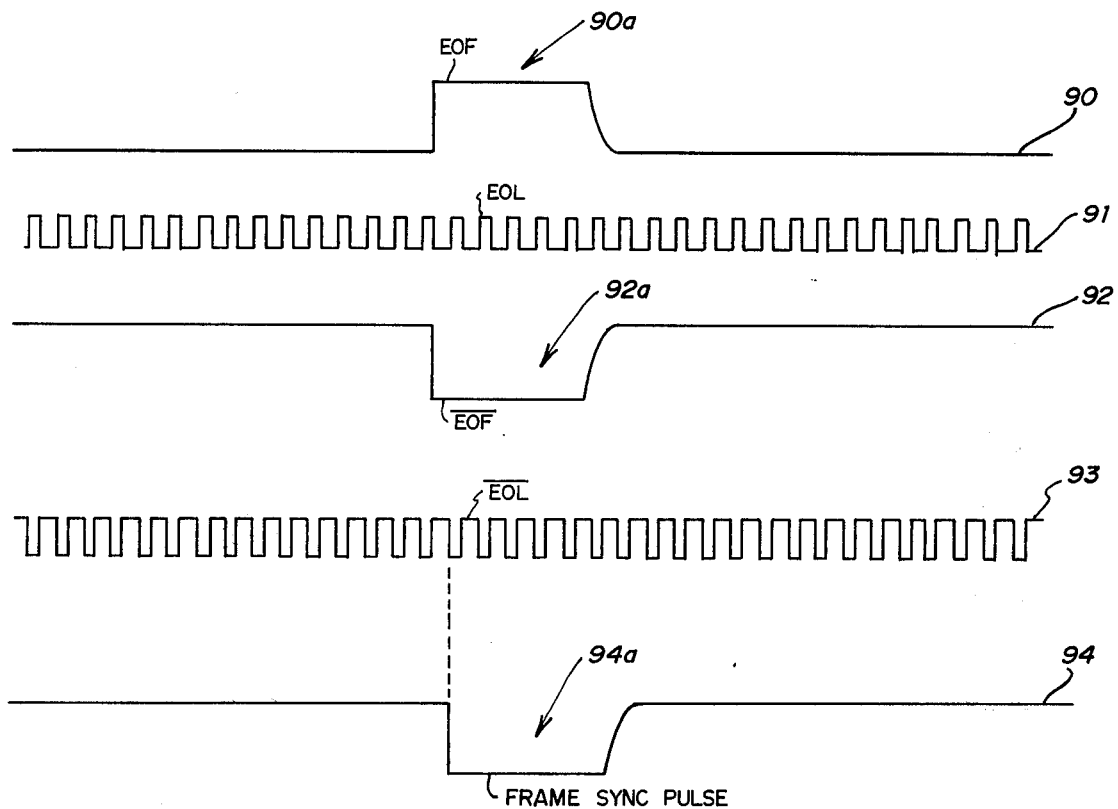
FIG. 4 is a waveform and timing diagram of the operation of the synchronization pulse generator of FIG. 3.

FIG. 4 is a waveform and timing diagram of the operation of the flip-flop 80 of FIG. 3. The EOF signal applied by array 16 on line 16b is illustrated by waveform 90. The EOL signal on line 16a is illustrated by waveform 91. Waveform 92 illustrates the complement of waveform 90 appearing at the collector of transistor 30, and waveform 93 illustrates the complement of waveform 91 appearing at the collector of transistor 32. Waveform 94 in turn illustrates the frame synchronization pulse applied by transistors 76 and 77 to line 18a.

By inspection of FIG. 4 it may be seen that the leading or negative-going edge of the frame synchronization pulse 94a of waveform 94 occurs during the period defined by pulse 92a of waveform 92, and is in synchronization with the leading edge of the first negative-going pulse of waveform 93 that occurs during that period. The effect of the Schottky transistors comprising flip-flop 80 is to provide a frame synchronization pulse 94a having a leading edge rising time small compared to a sensor cell recharging time.

FIG. 5

Figure 5:
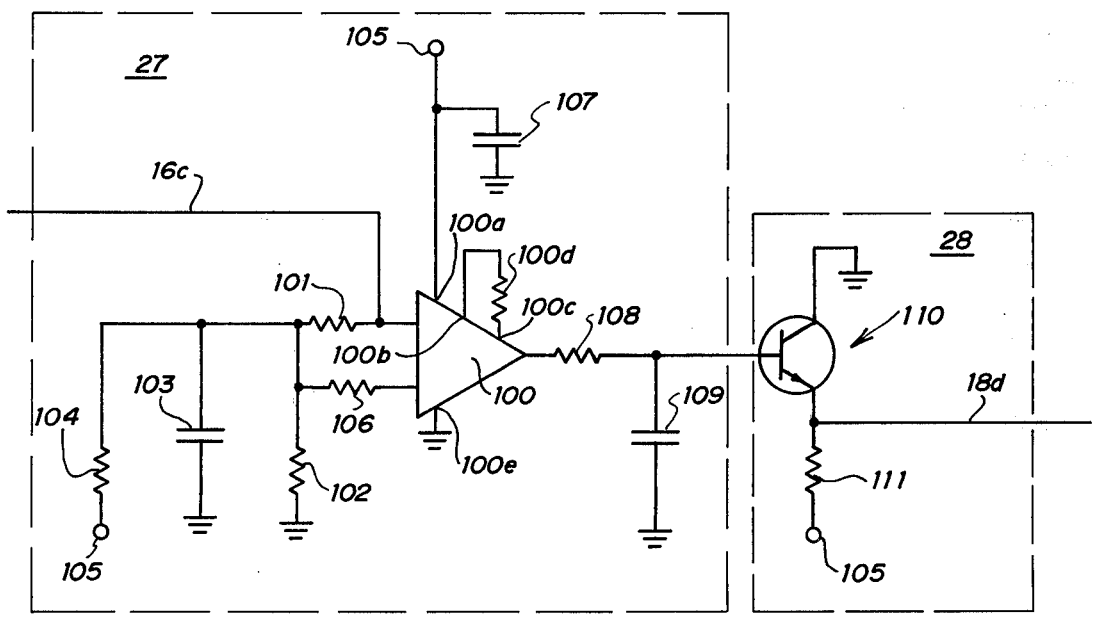
FIG. 5 is a detailed electrical schematic diagram of a sensor sampling system in accordance with the invention.

FIG. 5 is a detailed electrical schematic diagram of amplifier 27 and line driver 28 of FIG. 2.

A video signal comprised of sensor cell recharge currents on line 16c is received at one input of an amplifier 100, which is a wideband, high gain, IC video amplifier, industry type 733, manufactured and sold by Fairchild Semiconductor of Mountain View, California. Line 16c also is connected through a 1.0 K-ohm resistor 101 and a 1.0 K-ohm resistor 102 to ground, and through resistor 101 to a first terminal of a 0.01 microfarad capacitor 103. The first terminal of capacitor 103 also is connected through a 1.0 K-ohm resistor 104 to a −12 volt source 105. A second terminal of capacitor 103 is connected to ground.

A second input to amplifier 100 is connected through a 1.0 K-ohm resistor 106 and resistor 102 to ground. A positive power supply input 100a of amplifier 100 is connected to voltage source 105, and to a first terminal of a 0.01 microfarad capacitor 107 having a second terminal connected to ground. Gain control inputs 100b and 100c are joined through a 33 ohm resistor 100d, and the negative power supply input 100e is connected to ground. The output of amplifier 100 is applied through a 1.0 K-ohm resistor 108 to a first terminal of a 22 picofarad capacitor 109, and through resistor 108 to the base of an NPN transistor 110. A second terminal of capacitor 109 is connected to ground.

Amplifier 100, resistors 100d, 101, 102, 104, 106 and 108, and capacitors 103, 107 and 109 comprise preamplifier 27 of FIG. 2, which has the operating characteristics of a transresistance amplifier.

The collector of transistor 110 is connected to ground, and the emitter is connected through a 560 ohm resistor 111 to voltage source 105. The emitter also is connected to a line 18d of cable 18, FIG. 2. Transistor 110 and resistor 111 comprise line driver 28 of FIG. 2.

In operation, a bias voltage of −6 volts is developed at a node intermediate to the resistors 104 and 102, which form a divider network across the voltage source 105. The capacitor 103 causes the −6 volt bias point to appear as an AC ground. The apparent input inpedance seen by line 16c at a cell scan rate of 1.8 MHz, therefore, approximates the resistance of resistor 101 as the input resistance to amplifier 100 at the cell scan rate is approximately ten times the value of resistor 101.

The apparent input impedance of 1.0 K-ohm is essentially constant over a wide bandwidth between about 100 KHz and 50 MHz. With a video drain line capacitance of 40 picofarads, the recharge time constant is 40 nanoseconds. Thus, a sensor cell may be sampled and completely recharged during the 555 nanosecond cell scan period of the preferred embodiment, thereby eliminating the image smearing caused by the sampling of a sensor cell not completely recharged in a previous cell scan period. As used herein, the term sampling refers collectively to the recharging of an addressed sensor cell, the conversion of the recharging current to a voltage, and the amplification of such voltage.

The recharge current on line 16c developes a voltage signal across resistor 101. The signal is amplified by video amplifier 100, the gain of which is controlled by the value of resistor 100d. The response of the amplifier remains substantially uniform from DC to about 50 MHz without the assistance of feedback stabilization networks.

The output from amplifier 100 is fed to a RC filter network comprising resistor 108 and capacitor 109, which has a −3 db response at approximately 5 MHz. The filter output is applied to the base of transistor 110, which is connected as an emitter follower to drive line 18d of cable 18. When connected as shown, transistor 110 is protected against the shorting of the output video signal to ground.

In accordance with the invention, there is provided a scan control and sensor sampling system for a two-dimensional photosensor array which is compatible with integrated circuit embodiments, and which operates to preserve the integrity of the video image at high sensor cell scan rates. More particularly, a monolithic integrated circuit forms a single accurate synchronization signal from array timing signals, and stabilizes the synchronization signal within a sensor cell scan period to synchronize the drive control electronics with the scanning of the array. The monolithic circuit in addition performs a clamping action upon the array timing signals to limit the amplitude swings of the signals, thereby substantially reducing related modulations in the video output signal. Further, clock signals controlling the scanning of the array are generated by CMOS implemented D-type flip-flops providing large voltage amplitude swings to drive the array without the dissipation of excessive heat. The CMOS flip-flops have a maximum skew of 10 nanoseconds between complementary outputs to substantially reduce fixed pattern odd/even noise in the output video signal. In addition, the sensor cells comprising the array are serially selected by the array and sampled by a wideband, high gain, integrated circuit transresistance video voltage amplifier having a low input impedance at high scan rates, thereby accommodating the complete recharging of a sensor cell within a cell scan period.

Having described the invention in connection with certain specific embodiments thereof, it is to be understood that further modifications may now suggest themselves to those skilled in the art, and it is intended to cover such modifications as fall within the scope of the appended claims.

What is claimed is:

1. In a scan control and sensor cell sampling system for a self-scanned array of photo sensor cells the output of which is a video signal, the combination which comprises:
    a. signal generating means receiving timing signals from said array for limiting the amplitude swing of said timing signals and forming a single synchronization signal from said timing signals;
    b. clock signal generating means responsive to said synchronization signal for substantially reducing fixed pattern odd/even noise in the output video signal of said array and for forming biphase clock signals to control the scanning of said array, each clock signal being substantially in phase with its complement throughput the band width of the operating frequencies of said array; and
    c. sensor cells sampling means connected to the video signal output of said array and having an apparent low input impedance throughout said band width for complete recharging of a sensor cell within a sensor cell scan period at scan rates of the order of 1.8 MHz.

2. The combination set forth in claim 1, wherein said pulse generating means is an integrated circuit, said clock signal generating means is a CMOS integrated circuit, and said sensor cell sampling means is an integrated circuit.

3. The combination set forth in claim 1, where said signal generating means comprises:
    a. clamping means for limiting the amplitude swing of said timing signals; and
    b. D-type flip-flop means receiving said timing signals from said clamping means including Schottky transistors for generating a synchronization pulse accurately identifying the last cell of a frame of sensor cells scanned.

4. The combination set forth in claim 1, wherein said sensor cell sampling means includes a wideband, high gain integrated circuit video amplifier, and RC network means intermediate to said array and said amplifier said amplifier having an apparent input impedance low compared to the input inpedance of said amplifier over the bandwidth of operating frequencies of said array.

5. A scan control and sensor sampling system for a self-scanned photosensor array, which comprises:
    a. signal generating means receiving timing signals from said array for limiting the amplitude swing of said timing signals and forming a single synchronization signal from said timing signals;
    b. an oscillator for generating a first signal having a frequency equal to the sensor cell scan rate of said arrray;
    c. frequency divider means responsive to said synchronization signal and said oscillator for providing a second signal having a frequency equal to the row scan rate of said array;
    d. biphase clock signal generating means receiving said first and siad second signals for substantially reducing fixed pattern odd/even noise in the output video signal of said array and for controlling the scanning of said array; and
    e. sensor cell sampling means sensing the recharge current of each sensor cell selected by said array for recharging each selected sensor cell within a sensor cell scan period and converting the recharge current to an amplified voltage.

6. The combination set forth in claim 5, wherein means are provided for scanning the cells of said array at a sensor cell scan rate of about 1.8 MHz.

7. The combination set forth in claim 5, wherein said signal generating means is a monolithic integrated circuit.

8. The combination set forth in claim 7, wherein said monolithic integrated circuit means comprises:
a. level adjusting means for shifting the voltage level of said timing signals from a negative voltage level to a ground referenced positive-going voltage level; and
b. D-type flip-flop mean receiving signals from said level adjusting means for forming a pulse accurately identifying the last cell of a frame of sensor cells scanned.

9. The combination set forth in claim 8, wherein said D-type flip-flop means is comprised of Schottky transistors employed to provide said pulse with a leading edge rise time small compared to a sensor cell recharging time.

10. The combination set forth in claim 5, wherein said biphase clock signal generating means is a CMOS, integrated circuit, dual D-type flip-flop.

11. The combination set forth in claim 5, wherein said sensor cell sampling means includes a high gain integrated circuit video voltage amplifier, and RC input network means intermediate to the output of said array and the input of said amplifier for providing an apparent input impedance which is low compared to the input impedance of said amplifier over the bandwidth of operating frequencies of said array.

* * * * *